United States Patent
Marupaduga et al.

(10) Patent No.: US 9,392,468 B1
(45) Date of Patent: Jul. 12, 2016

(54) ADAPTIVE BEAMFORMING TECHNIQUES IN LONG TERM EVOLUTION NETWORKS

(71) Applicant: SPRINT COMMUNICATIONS COMPANY, L.P., Overland Park, KS (US)

(72) Inventors: Sreekar Marupaduga, Overland Park, KS (US); Andrew Mark Wurtenberger, Olathe, KS (US); Patrick Jacob Schmidt, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 39 days.

(21) Appl. No.: 14/067,086

(22) Filed: Oct. 30, 2013

(51) Int. Cl.
*H04W 72/00* (2009.01)
*H04W 16/28* (2009.01)

(52) U.S. Cl.
CPC ..................... *H04W 16/28* (2013.01)

(58) Field of Classification Search
CPC .............. H04W 16/28; H04W 76/043; H04W 74/0833; H04W 36/00; H04W 72/00; H04W 36/30; H04W 84/08; H04W 88/04; H04W 74/08; H04B 1/69; H04B 1/692; H03L 1/0003; H03M 1/46; H04L 1/1845; H04L 5/143; H04L 1/1819; H04L 1/1822

USPC .......................................................... 455/450
See application file for complete search history.

(56) References Cited

U.S. PATENT DOCUMENTS

| | | | | |
|---|---|---|---|---|
| 6,157,811 A * | 12/2000 | Dent | ...................... | H01Q 1/288 455/12.1 |
| 8,738,020 B2 * | 5/2014 | Li | ......................... | H04L 1/0003 370/203 |
| 2002/0122465 A1 * | 9/2002 | Agee | ........................ | H04B 1/69 375/141 |
| 2011/0275382 A1 * | 11/2011 | Hakola et al. | ............... | 455/452.2 |
| 2012/0082050 A1 * | 4/2012 | Lysejko | .............. | H04W 72/082 370/252 |
| 2013/0044697 A1 * | 2/2013 | Yoo | ..................... | H04W 72/082 370/329 |
| 2014/0179330 A1 * | 6/2014 | Du et al. | ....................... | 455/450 |
| 2014/0185495 A1 * | 7/2014 | Kuchibhotla et al. | ......... | 370/281 |

* cited by examiner

*Primary Examiner* — Mahendra Patel

(57) ABSTRACT

Systems, methods, and computer-readable media for providing adaptive beamforming techniques in LTE networks are provided. In embodiments, the method includes identifying user devices associated with device to device (D2D) groups in a sector. Unused static uplink beams provided by the sector are determined. In embodiments, the unused static uplink beams are allocated to user devices associated with the D2D groups. The unused static uplink beams are reallocated for other activities.

18 Claims, 3 Drawing Sheets

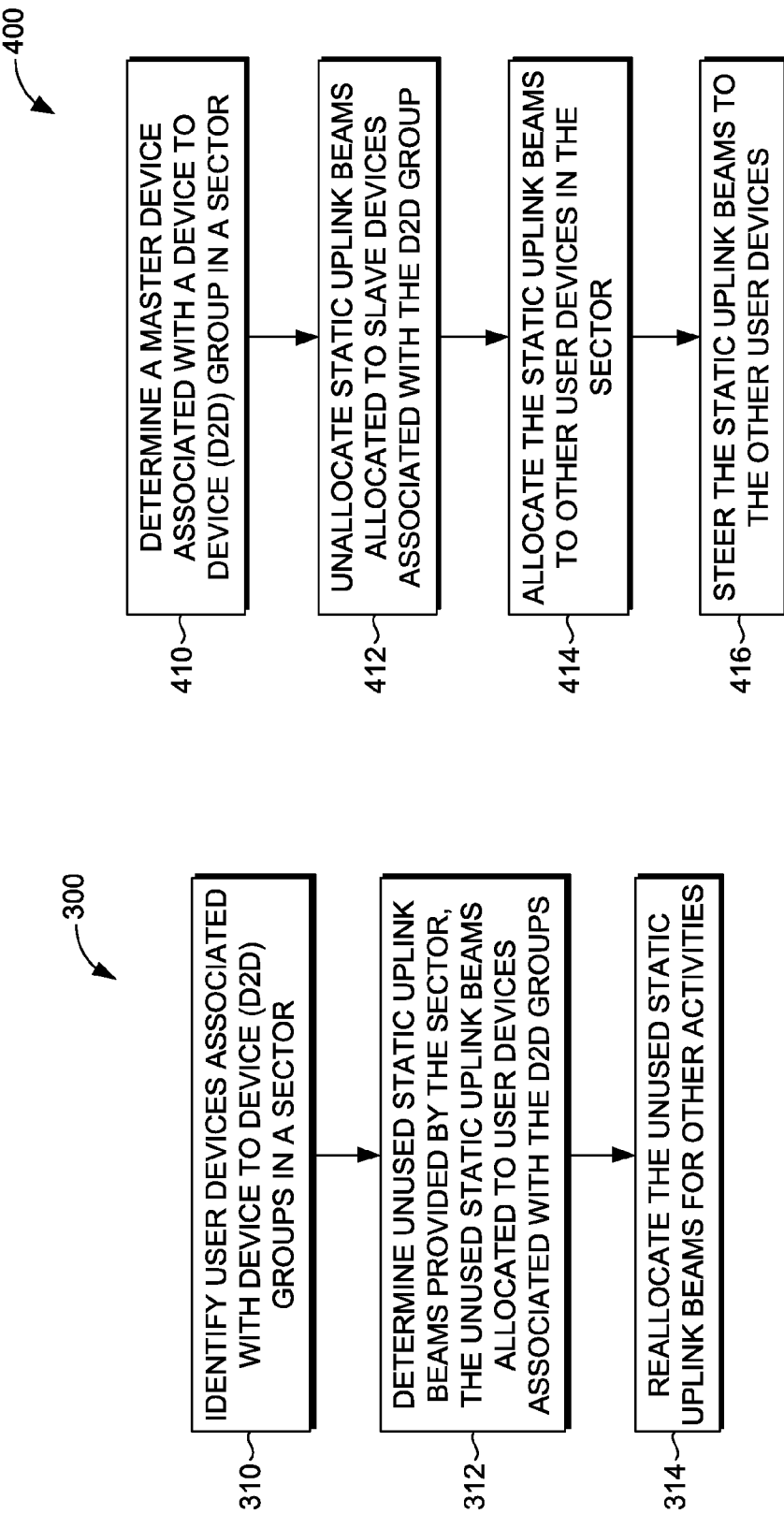

ADAPTIVE BEAMFORMING TECHNIQUES IN LONG TERM EVOLUTION NETWORKS

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, providing adaptive beamforming techniques in Long Term Evolution (LTE) networks. In embodiments, user devices associated with device to device (D2D) groups in a sector are identified. Unused static uplink beams provided by the sector are determined. In embodiments, the unused static uplink beams are allocated to user devices associated with the D2D groups. The unused static uplink beams are reallocated for other activities.

BRIEF DESCRIPTION OF THE SEVERAL VIEWS OF THE DRAWINGS

Illustrative embodiments of the present invention are described in detail below with reference to the attached drawing figures, and wherein:

FIG. 3 is a flow diagram depicting an illustrative method of providing adaptive beamforming techniques in LTE networks, in accordance with embodiments of the invention; and FIG. 4 is a flow diagram depicting an illustrative method of providing adaptive beamforming techniques in LTE networks, in accordance with embodiments of the invention.

DETAILED DESCRIPTION

Figure 1:
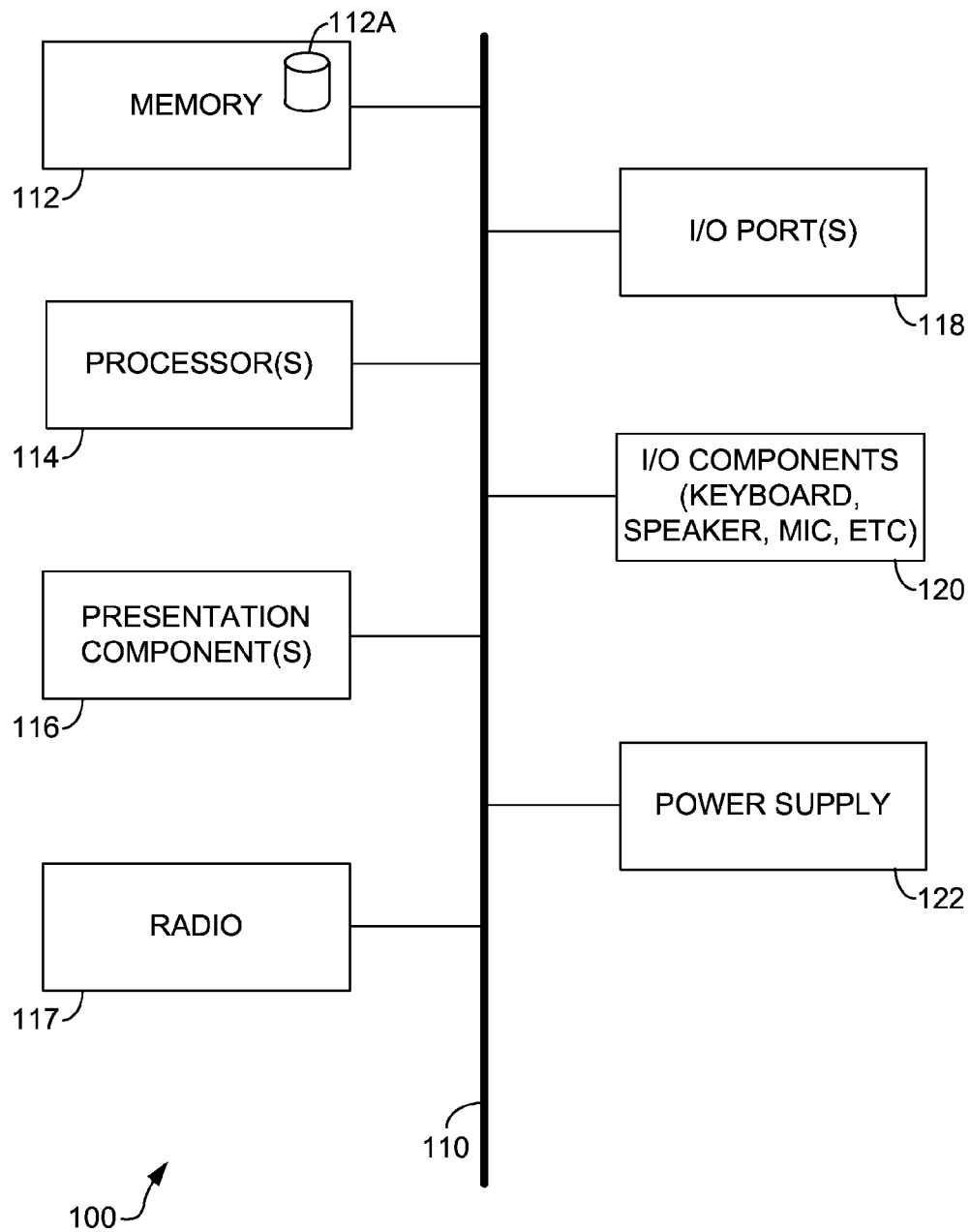
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

In LTE systems that implement beamforming, downlink and uplink beams are formed during initial deployment and are static in nature. This implementation is not optimal for LTE networks with high D2D groups. User devices in D2D groups communicate with each other over a cellular access spectrum associated with the D2D group. More simply, user devices in a D2D group do not require an uplink beam after initially connecting with the eNodeB. Thus, current uplink and downlink allocation in LTE systems is inefficient.

Embodiments of the present invention identify user devices that are not using an uplink beam allocated to them. Embodiments of the present invention reallocate the unused uplink beams for other activities. Embodiments of the present invention utilize a non-static uplink beam to scan for user devices exiting D2D groups and requesting uplink resources.

Accordingly, in one aspect, embodiments of the present invention are directed to computer storage media having computer-executable instructions embodied thereon that, when executed, perform a method of providing adaptive beamforming techniques in LTE networks. The method comprises: determining a master user device associated with a device to device (D2D) group in a sector; unallocating static uplink beams allocated to slave devices associated with the D2D group; allocating the static uplink beams to other user devices in the sector; and steering the static uplink beams to the other user devices.

In another aspect, embodiments of the present invention are directed to a method for providing adaptive beamforming techniques in LTE networks. The method comprises: determining a master user device associated with a device to device (D2D) group in a sector; unallocating static uplink beams allocated to slave devices associated with the D2D group; allocating the static uplink beams to other user devices in the sector; and steering the static uplink beams to the other user devices.

In yet another aspect, embodiments of the present invention are directed to a computer system for providing adaptive beamforming techniques in LTE networks. The computer system comprises a processor coupled to a computer-storage medium, the computer-storage medium having stored thereon a plurality of computer software components executable by the processor. The computer software components comprise: an identifying component that identifies user devices associated with device to device (D2D) groups in a sector; a determining component that determines a master device and slave devices associated with the D2D group in the sector, wherein the determining component further determines that the slave devices are allocated unused static uplink beams provided by the sector; and a reallocating component that unallocates the unused static uplink beams from the slave devices and reallocates the unused static uplink beams for other activities.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
CRM Customer Relations Management
D2D Device to Device
DVD Digital Versatile Discs
EEPROM Electrically Erasable Programmable Read Only Memory
ENODEB Evolved Node B
GPRS General Packet Radio Service
GPS Global Positioning System
GSM Global System for Mobile Communications
HLR Home Location Register
iDEN Integrated Digital Enhanced Network
LTE Long Term Evolution
MSC Mobile Serving Center MMS Multimedia Messaging Service
PC Personal Computer
PCS Personal Communications Service
PDA Personal Digital Assistant
PLMN Public Land Mobile Network
RAM Random Access Memory
RF Radio Frequency
ROM Read Only Memory
SIB2 SystemInformationBlockType2
SLA Service Level Agreement
SMS Short Message Service
TDMA Time Division Multiple Access
UMTS Universal Mobile Telecommunications Systems
VoIP Voice over IP
Wi-Fi Wireless Fidelity
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
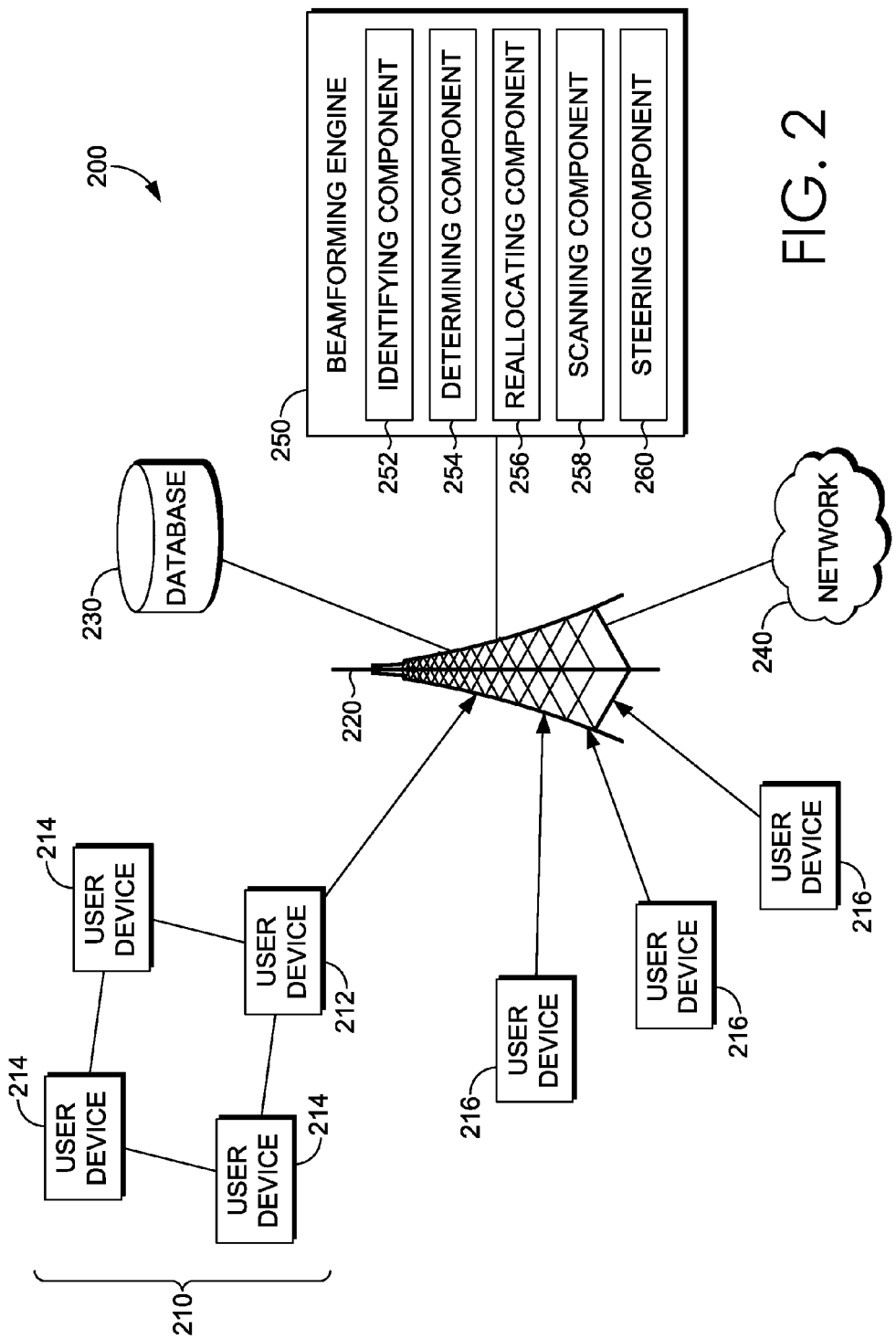
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, user devices 212, 214, 216 may communicate with other devices, such as mobile devices, servers, etc. The user devices 212, 214, 216 may take on a variety of forms, such as a personal computer (PC), a laptop computer, a tablet, a netbook, a mobile phone, a Smart phone, a personal digital assistant (PDA), or any other device that is cable of communicating with other devices. For example, the user devices 212, 214, 216 can take on any form, such as, for example, mobile devices or any other computing devices capable of wirelessly communicating with the other devices using a network. Makers of illustrative devices include, for example, Research in Motion, Creative Technologies Corp., Samsung, Apple Computer, and the like. A device can include, for example, a display(s), a power source (s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The devices 212, 214, 216 can utilize a network 240 to communicate with other computing devices (e.g., a mobile device(s), a server(s), a personal computer(s), etc.). In embodiments, the network is a telecommunications network (s), or a portion thereof. A telecommunications network might include an array of devices or components (e.g., eNodeB 220), some of which are not shown so as to not obscure more relevant aspects of the invention. Components such as terminals, links, and nodes (as well as other components) can provide connectivity in some embodiments. The network 240 can include multiple networks, as well as being a network of networks, but is shown in more simple form so as to not obscure other aspects of the present invention. The network can be part of a telecommunication network that connects subscribers to their immediate service provider. In embodiments, the network 240 can be associated with a telecommunications provider that provides services (e.g., LTE) to user devices, such as user devices 212, 214, 216. For example, the network 240 may provide voice services to user devices or corresponding users that are registered or subscribed to utilize the services (e.g., LTE) provided by a telecommunications provider. The network 240 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In implementation, eNodeB 220 is associated with a database 230 and a beamforming engine 250 comprising various components that are utilized, in various embodiments, to perform a method of providing adaptive beamforming techniques in LTE networks. In one embodiment, the beamforming engine 250 is a component of the eNodeB 220. In one embodiment, the beamforming engine 250 is separate from the eNodeB 220. The beamforming engine 250, in various embodiments, includes identifying component 252, determining component 254, reallocating component 256, scanning component 258, and steering component 260.

Identifying component 252 identifies user devices associated with device to device (D2D) groups in a sector. Identifying component 252 may communicate with database 230 to identify user devices in D2D groups. The database 230 may maintain a list of each D2D group in the sector and devices associated with each respective D2D group.

Determining component 254 determines a master device and slave devices associated with the D2D group in the sector. The master device may be determined by identifying the user device with the highest radio frequency capability out of the devices associated with the D2D group. Each of the user devices in the D2D group not identified as the master device are slave devices of the D2D group. The slave devices use the uplink beam allocated to the master device. In this regard, the determining component 254 further determines that the slave devices are allocated unused static uplink beams provided by the sector.

Reallocating component 256 unallocates the unused static uplink beams from the slave devices. The reallocating component 256 further reallocates the unused static uplink beams for other activities. The other activities may be for use as downlink beams, for use as a non-static uplink beam, for use by user devices leaving a D2D group, for use by user devices not associated with a D2D group, and the like.

In one embodiment, scanning component 258 utilizes a non-static uplink beam to scan for one or more devices leaving a D2D group. Any devices leaving a D2D group will no longer be able to utilize a non-static uplink beam allocated to the master device. Accordingly, devices leaving a D2D group may request uplink resources from the eNodeB and will need to be allocated a non-static uplink beam. In one embodiment, steering component 260 steers unused static uplink beams towards the one or more user devices leaving the D2D group.

Referring now to FIG. 3, a flow diagram depicts a method 300 of providing adaptive beamforming techniques in LTE networks, in accordance with embodiments of the invention. Initially, at step 310, user devices associated with device to device (D2D) groups in a sector are identified. A database associated with the eNodeB may maintain a list of D2D groups and associated devices, such that the eNodeB is aware when a user device enters a D2D group. At step 312, unused static uplink beams provided by the sector are determined. The unused static uplink beams may be allocated to user devices associated with the D2D groups. The static uplink beams may be unused because the user devices are slave devices in the D2D groups and use the static uplink beams associated with the master device in the corresponding D2D group. At step 314, the unused static uplink beams are reallocated for other activities.

In one embodiment, a non-static uplink beam scans for one or more devices leaving a D2D group. Unused static uplink beams may be steered towards the one or more devices leaving the D2D group. The one or more devices leaving the D2D group may be requesting uplink resources. Similarly, as described above, a database associated with the eNodeB may maintain a list of D2D groups and associated devices. The eNodeB may be aware when a user device leaves a D2D group. In this regard, the eNodeB may identify user devices requesting uplink resources (or those that do not need their own uplink beams) by communicating with the database.

In one embodiment, a master device for each of the D2D groups is identified. A user device in each D2D group may be determined to have a higher radio frequency capability than other devices in the respective D2D group. The master device is the user device with the higher radio frequency capability for each respective D2D group. The other devices (i.e., not the user device identified as the master device) in each respective D2D group are slave devices. In one embodiment, the static uplink beams allocated to the slave devices are not used by the slave devices. Instead, the slave user devices may use the static uplink beam allocated to each respective master device.

Referring now to FIG. 4, a flow diagram depicts an illustrative method 400 of providing adaptive beamforming techniques in LTE networks, in accordance with an embodiment of the present invention. Initially, at step 410, a master device associated with a device to device (D2D) group in a sector is determined. The master device is determined to be the master because it has a higher radio frequency capability than other user devices associated with the D2D group.

Static uplink beams allocated to slave devices associated with the D2D group are unallocated at step 412. The slave devices are the other user devices associated with the D2D group that are not determined to be the master device. This may be because the slave devices have a lower radio frequency capability than the device determined to be the master. The slave devices in the D2D group do not need their own uplink beams because, while in the D2D group, they each share the uplink beam allocated to the master device. Accordingly, at step 414, the static uplink beams that have been unallocated from the slave devices are allocated to other user devices in the sector. At step 416, these static uplink beams are steered to the other user devices.

In one embodiment, an uplink beam scans for slave devices leaving the D2D group. In one embodiment, a dedicated non-static uplink beam is utilized to scan for the slave devices leaving the D2D group. Upon the dedicated uplink beam identifying slave devices leaving the D2D group, static beams may be allocated and steered to the slave devices leaving the D2D group.

In one embodiment, an uplink number of uplink beams and a downlink number of downlink beams in a sector are dynamically adjusted. The uplink number and the downlink number may be based on a number of D2D groups in the sector. The number of D2D groups in the sector may be inversely related to the uplink number such that a higher number of D2D groups in the sector results in a lower number of uplink beams being allocated in the sector. Similarly, a lower number of D2D groups in the sector results in a higher number of uplink beams being allocated in the sector. As can be appreciated, as the number of D2D groups change, the number of uplink beams and downlink beams is dynamically adjusted accordingly.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Computer storage having computer-executable instructions embodied thereon that, when executed, perform a method of providing adaptive beamforming techniques in Long Term Evolution (LTE) networks, the method comprising:
    identifying user devices associated with device to device (D2D) groups in a sector;
    determining unused static uplink beams provided by the sector, the unused static uplink beams allocated to slave user devices associated with the D2D groups that use an uplink beam allocated to a master device of the D2D group; and
    reallocating the unused static uplink beams for other activities including use as a downlink beam, use as a non-static uplink beam, use by user devices leaving a D2D group, or use by user devices not associated with a D2D group,
    wherein a dedicated non-static uplink beam is utilized to scan for the slave devices leaving the D2D group.

2. The computer storage of claim 1, further comprising scanning for one or more devices leaving a D2D group.

3. The computer storage of claim 2, steering the unused static uplink beams towards the one or more devices leaving the D2D group.

4. The computer storage of claim 3, wherein the one or more devices leaving the D2D group are requesting uplink resources.

5. The computer storage of claim 1, further comprising identifying a master device for each of the D2D groups.

6. The computer storage of claim 5, further comprising determining a user device in each D2D group with a higher radio frequency capability than other devices in the respective D2D group.

7. The computer storage of claim 6, wherein the master device is the user device with the higher radio frequency capability for each respective D2D group.

8. The computer storage of claim 7, wherein the other devices in each respective D2D group are slave devices.

9. The computer storage of claim 8, wherein the static uplink beams allocated to the slave devices are not used by the slave devices.

10. The computer storage of claim 9, wherein the slave user devices use the static uplink beam allocated to each respective master device.

11. Computer storage having computer-executable instructions embodied thereon that, when executed, perform a method of providing adaptive beamforming techniques in Long Term Evolution (LTE) networks, the method comprising:
    determining a master device associated with a device to device (D2D) group in a sector, the master device having a higher radio frequency capability than other user devices associated with the D2D group;
    unallocating static uplink beams allocated to slave devices associated with the D2D group, the slave devices being the other user devices associated with the D2D group that are not determined to be the master device and that use an uplink beam allocated to the master device;
    allocating the static uplink beams to other user devices in the sector that are not associated with a D2D group; and
    steering the static uplink beams to the other user devices,
    wherein a dedicated non-static uplink beam is utilized to scan for the slave devices leaving the D2D group.

12. The computer storage of claim 11, wherein upon the dedicated uplink beam identifying slave devices leaving the D2D group, static beams are allocated and steered to the slave devices leaving the D2D group.

13. The computer storage of claim 11, further comprising dynamically adjusting an uplink number of uplink beams and a downlink number of downlink beams in a sector.

14. The computer storage of claim 13, wherein the uplink number and the downlink number is based on a number of D2D groups in the sector.

15. The computer storage of claim 14, wherein the number of D2D groups in the sector is inversely related to the uplink number.

16. A computer system for providing adaptive beamforming techniques in Long Term Evolution (LTE) networks, the computer system comprising a processor coupled to computer-storage, the computer-storage having stored thereon instructions executable by the processor, the instructions causing the processor to:
    identify user devices associated with device to device (D2D) groups in a sector;
    determine a master device and slave devices associated with the D2D group in the sector, and further determines that the slave devices are allocated unused static uplink beams provided by the sector; and
    unallocated the unused static uplink beams from the slave devices and reallocates the unused static uplink beams for other activities including use as a downlink beam, use as a non-static uplink beam, use by user devices leaving a D2D group, or use by user devices not associated with a D2D group,
    wherein a dedicated non-static uplink beam is utilized to scan for the slave devices leaving the D2D group.

17. The computer system of claim 16, further comprising instructions causing the processor to utilize a non-static uplink beam to scan for one or more user devices leaving a D2D group.

18. The computer system of claim 17, further comprising instructions causing the processor to steer unused static uplink beams towards the one or more user devices leaving the D2D group.

* * * * *